(12) United States Patent
Kumar et al.

(10) Patent No.: US 11,755,174 B2
(45) Date of Patent: *Sep. 12, 2023

(54) TEMPLATE BASED CALENDAR EVENTS WITH GRAPHIC ENRICHMENT

(71) Applicant: Microsoft Technology Licensing, LLC, Redmond, WA (US)

(72) Inventors: Michael J. Kumar, Seattle, WA (US); Hiroshi Tsukahara, Bellevue, WA (US); Brian T. Carver, Bellevue, WA (US); Margaret R. Clinton, Redmond, WA (US); Elona Tuomi, Redmond, WA (US); Jiang Wan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/064,014

(22) Filed: Oct. 6, 2020

(65) Prior Publication Data

US 2021/0034203 A1  Feb. 4, 2021

Related U.S. Application Data

(63) Continuation of application No. 15/437,109, filed on Feb. 20, 2017, now Pat. No. 10,838,584.

(Continued)

(51) Int. Cl.
*G06F 3/0482* (2013.01)
*G06Q 10/10* (2023.01)
(Continued)

(52) U.S. Cl.
CPC ........ *G06F 3/0482* (2013.01); *G06F 3/04817* (2013.01); *G06F 3/04842* (2013.01);
(Continued)

(58) Field of Classification Search
CPC ........................... G06F 3/0482; G06Q 10/1093
See application file for complete search history.

(56) References Cited

U.S. PATENT DOCUMENTS 8,166,019 B1 *  4/2012  Lee ................... G06Q 10/1093
                                                             707/963
9,424,247 B1 *  8/2016  Tomkins ................. G06F 40/30
(Continued)

FOREIGN PATENT DOCUMENTS

CN  101228501 A   7/2008
CN  104463552 A   3/2015
(Continued)

OTHER PUBLICATIONS

"Office Action Issued in Indonesia Patent Application No. P00201903540", dated Apr. 29, 2021, 3 Pages.
(Continued)

*Primary Examiner* — William L Bashore
*Assistant Examiner* — Nathan K Shrewsbury
(74) *Attorney, Agent, or Firm* — NovoTechIP International PLLC

(57) ABSTRACT

Template based calendar events with graphic enrichment are provided. In some examples, upon receiving a request to create a calendar event, an event creation prompt may be presented. The prompt may include an event template selection element comprising visual aids, such as icons or emojis, that each represent different event templates for selection. Upon receiving a visual aid selection, information associated with the user requesting the calendar event may be retrieved based on the selected visual aid to infer one or more aspects of the requested event such as title, timing, and location. A suggested event with the inferred aspects may be presented to the user and upon receiving confirmation and/or modification, the suggested or modified event may be added to the user's calendar. Some events may be presented with a visual background such as an image or graphics on the calendar for prompt recognition.

20 Claims, 12 Drawing Sheets

Related U.S. Application Data

(60) Provisional application No. 62/415,420, filed on Oct. 31, 2016.

(51) Int. Cl.

| | |
|---|---|
| *G06F 40/174* | (2020.01) |
| *G06F 40/186* | (2020.01) |
| *G06F 3/04842* | (2022.01) |
| *G06F 9/451* | (2018.01) |
| *G06F 3/04817* | (2022.01) |
| *G06F 3/04845* | (2022.01) |
| *G06Q 10/1093* | (2023.01) |

(52) U.S. Cl.
CPC .......... *G06F 3/04845* (2013.01); *G06F 9/453* (2018.02); *G06F 40/174* (2020.01); *G06F 40/186* (2020.01); *G06Q 10/10* (2013.01); *G06Q 10/1093* (2013.01)

(56) References Cited

U.S. PATENT DOCUMENTS

| | | | |
|---|---|---|---|
| 10,007,886 B1* | 6/2018 | Khvostichenko .. | G06Q 10/1093 |
| 10,838,584 B2 | 11/2020 | Kumar et al. | |
| 10,956,874 B2* | 3/2021 | Gurdin ................ | G06Q 10/109 |
| 2004/0264301 A1 | 12/2004 | Howard et al. | |
| 2008/0319818 A1* | 12/2008 | Gurdin ................ | G06Q 10/109 |
| | | | 705/7.24 |
| 2009/0100332 A1* | 4/2009 | Kanjilal ................ | G06Q 10/109 |
| | | | 715/234 |
| 2010/0123724 A1* | 5/2010 | Moore ................ | H04M 1/7243 |
| | | | 345/173 |
| 2010/0306309 A1 | 12/2010 | Santori et al. | |
| 2011/0119628 A1* | 5/2011 | Carter ................ | G06Q 10/1093 |
| | | | 715/811 |
| 2012/0124467 A1 | 5/2012 | Harrington et al. | |
| 2013/0041948 A1* | 2/2013 | Tseng ................ | H04W 4/18 |
| | | | 709/204 |
| 2013/0268886 A1* | 10/2013 | Sureshkumar ...... | G06F 3/04842 |
| | | | 715/810 |
| 2014/0180829 A1 | 6/2014 | Umeda | |
| 2014/0288990 A1* | 9/2014 | Moore ................ | G06Q 10/107 |
| | | | 705/7.19 |
| 2015/0127403 A1* | 5/2015 | Petty .................... | G06F 3/0481 |
| | | | 705/7.18 |
| 2015/0135085 A1* | 5/2015 | Shoham ............. | G06Q 10/1095 |
| | | | 715/739 |
| 2015/0177952 A1* | 6/2015 | Meyer ............. | G06Q 10/06311 |
| | | | 715/739 |
| 2015/0347982 A1 | 12/2015 | Jon et al. | |
| 2016/0062570 A1* | 3/2016 | Dascola ................ | G06F 3/0481 |
| | | | 715/765 |
| 2017/0126689 A1* | 5/2017 | Lloyd ................ | G06F 3/04817 |
| 2017/0192625 A1* | 7/2017 | Kim .................... | G06Q 10/1093 |
| 2021/0034203 A1* | 2/2021 | Kumar ................ | G06F 3/04842 |

FOREIGN PATENT DOCUMENTS

| | | |
|---|---|---|
| CN | 105229565 A | 1/2016 |
| CN | 105339960 A | 2/2016 |
| CN | 105431807 A | 3/2016 |
| JP | H0721262 A | 1/1995 |
| JP | H0877111 A | 3/1996 |
| JP | 2002304500 A | 10/2002 |
| RU | 2369988 C2 | 10/2009 |
| WO | 2004079501 A2 | 9/2004 |
| WO | 2018081028 A1 | 5/2018 |

OTHER PUBLICATIONS

"A method for automatically detecting mistaken selection of one icon over", In Technical Disclosure of PriorArtDatabase, Dec. 20, 2005, 3 Pages.

"Great Meetings: Outlook Meeting Template", Retrieved From : https://www.vorne.com/pdf/great-meetings-outlook-meeting-template.pdf, Dec. 20, 2015, 1 Page.

"How to Attach Your Own Icon to a File (Visual Installer Tip)", Retrieved From : https://web.archive.org/web/*/https://www.samlogic.net/visual-installer/tips/tips-pages/attach-icon-to-file/attach-icon-to-file.htm, Oct. 26, 2016, 2 Pages.

"Summons to Attend Oral Proceedings Issued in European Patent Application No. 17794579.7", dated May 20, 2021, 8 Pages.

"Office Action Issued in Japanese Patent Application No. 2019-521457", dated Sep. 22, 2021, 8 Pages.

"Office Action and Search Report Issued in Chile Patent Application No. 201901062", dated Sep. 14, 2020, 14 Pages.

"Office Action Issued in Japanese Patent Application No. 2019-521457", dated Mar. 14, 2022, 8 Pages.

"Office Action Issued in Chile Patent Application No. 2019/001062", dated Oct. 28, 2021, 5 Pages.

"Office Action Issued in Colombian Patent Application No. NC2019/0003767", dated Oct. 27, 2021, 22 Pages.

"Office Action Issued in Chille Patent Application No. 2019/01062", dated Mar. 8, 2021, 13 Pages.

"Office Action Issued in Indian Patent Application No. 201947014503", dated Jul. 20, 2021, 7 Pages.

"Office Action Issued in Israel Patent Application No. 266232", dated Feb. 9, 2022, 10 Pages.

Herrmann, Ralf,"Color Emoji in Windows 8.1—The Future of Color Fonts?", Retrieved From: https://opentype.info/blog/2013/07/03/color-emoji-in-windows-8-1-the-future-of-color-fonts.html?redirect=true, Jul. 3, 2013, 7 Pages.

"How to Use Outlook", Retrieved From: https://www.avidian.com/crm-resource-and-guide/guide-to-using-outlook/, Jan. 31, 2015, 23 Pages.

"Office Action Issued in European Patent Application No. 17794579.7", dated Dec. 7, 2020, 6 Pages.

"Office Action Issued in Israel Patent Application No. 266232", dated Nov. 30, 2020, 6 Pages.

Pencarian, Ulangi, "How To Make Smiley in Outlook", Retrieved From: https://theultralightradiodxer.siswapelajar.com/2012/07/how-to-make-smiley-in-outlook.html, Jul. 28, 2012, 52 Pages.

Toratani, et al., "Psychological Analysis of Emoticons used for E-mails on Cellular Phones", In Proceedings of International Conference on Mobile IT Convergence, Sep. 26, 2011, pp. 49-53.

"Office Action Issued in Russian Patent Application No. 2019112853", dated Feb. 10, 2021, 18 Pages.

"Office Action Issued in Korean Patent Application No. 10-2019-7015455", dated Nov. 3, 2022, 12 Pages.

"First Office Action and Search Report Issued in Chinese Patent Application No. 201780067323.4", dated Nov. 29, 2022, 31 Pages.

"Notice of Allowance Issued in Japanese Patent Application No. 2019-521457", dated Nov. 10, 2022, 5 Pages.

"Office Action Issued in Mexican Patent Application No. MX/a/2019/004861", dated Nov. 1, 2022, 6 Pages.

Ran, Wei, "Visual Rhetoric Analysis of Network Emojis", In Journal of Southeast Communication, Issue 10, Oct. 20, 2016, 6 Pages.

"Hyundai H Mall, Mobile App Renewal . . . Optimize Shopping Convenience", Retrieved From: https://n.news.naver.com/mnews/article/015/0003119369, Jul. 14, 2014, 5 Pages.

"Office Action Issued in Korean Patent Application No. 10-2019-7015455", dated Apr. 8, 2022, 22 Pages.

"Office Action Issued in Chile Patent Application No. 2019/01062", dated May 9, 2022, 5 Pages.

"Office Action Issued in Japanese Patent Application No. 2019-521457", dated Jun. 22, 2022, 11 Pages.

"Office Action Issued in Mexican Patent Application No. MX/a/2019/004861", dated Jun. 23, 2022, 9 Pages.

"Office Action Issued in New Zealand Patent Application No. 751444", dated Sep. 5, 2022, 3 Pages.

"Office Action Issued in Australian Patent Application No. 2017350770", dated Sep. 15, 2022, 5 Pages.

"Office Action Issued in Australian Patent Application No. 2017350770", dated Dec. 23, 2022, 6 Pages.

"Office Action Issued in Korean Patent Application No. 10-2019-7015455", dated Jan. 17, 2023, 6 Pages.

(56) References Cited

OTHER PUBLICATIONS

"Office Action Issued in New Zealand Patent Application No. 751444", dated Jan. 9, 2023, 6 Pages.
"Office Action Issued in New Zealand Patent Application No. 751444", dated Mar. 29, 2023, 7 Pages.
"Office Action Issued in Canadian Patent Application No. 3037355", dated Mar. 2, 2023, 3 Pages.
"Office Action Issued in Australian Patent Application No. 2017350770", dated Apr. 17, 2023, 5 Pages.
"Notice of Allowance Issued in Singapore Patent Application No. 11201903342P", dated May 22, 2023, 4 Pages.
"Notice of Allowance and Search Report Issued in Chinese Patent Application No. 201780067323.4", dated Apr. 19, 2023, 8 Pages.
"Office Action Issued in Israel Patent Application No. 266232", dated May 10, 2023, 7 Pages.
"Office Action and Search Report Issued in Brazil Patent Application No. BR112019006442-7"dated Apr. 11, 2023, 8 Pages.
"Notice of Allowance Issued in Korean Patent Application No. 10-2019-7015455", dated May 22, 2023, 8 Pages.
"Office Action Issued in Australian Patent Application No. 2017350770", dated Jun. 28, 2023, 5 Pages.
"Office Action Issued in New Zealand Patent Application No. 751444", dated Jul. 21, 2023, 8 Pages.

* cited by examiner

TEMPLATE BASED CALENDAR EVENTS WITH GRAPHIC ENRICHMENT

CROSS-REFERENCE TO RELATED APPLICATION

The present application is a continuation of, and claims the benefit of the filing date of co-pending U.S. patent application Ser. No. 15/437,109, filed Feb. 20, 2017, entitled "TEMPLATE BASED CALENDAR EVENTS WITH GRAPHIC ENRICHMENT," which claims the benefit of U.S. Provisional Patent Application No. 62/415,420, filed on Oct. 31, 2016, the entire disclosure and contents of which are hereby incorporated by reference herein.

BACKGROUND

There are many software tools to assist people with their busy days and tasks. Calendar applications are one of those tools allowing people to schedule events such as meetings, tasks, appointments, etc. Modern calendar applications are typically much more than a scheduling tool and provide a wide variety of functionality and features. The essence of calendar applications is still based on same concepts. For example, a user indicates they want to create an event, the user provides all details of the event, and the event is created and displayed on a calendar with textual presentation such as title and timing of the event. Thus, with increased usage of calendar applications, the user experience may leave room for improvements to assist users in efficiency.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing template based calendar events with graphic enrichment. In some examples, a request to create a calendar event may be received and visual aids may be presented for selection, where each of the visual aids represents an event template. Upon receiving a visual aid selection, information associated with the user requesting the event may be retrieved based on the selected visual aid to infer one or more aspects of the requested event. A suggested event with the inferred aspects may be presented to the user and, upon receiving user confirmation and/or modification to the suggested event, the event as suggested or modified may be added to the user's calendar with a visual background presentation.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
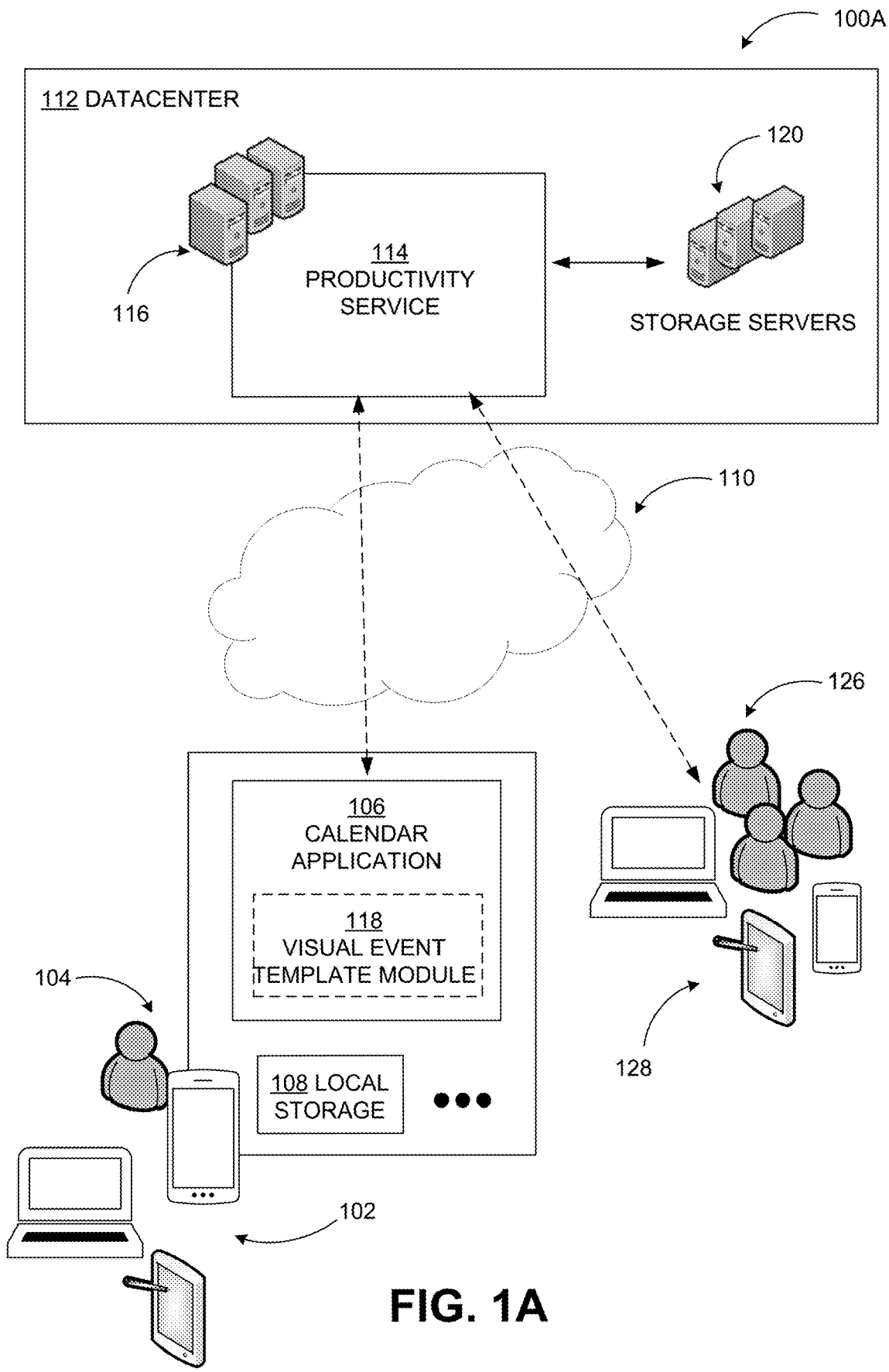
FIGS. 1A through 1B include example network environments where a system to provide template based calendar events with graphic enrichment may be implemented.

As briefly described above, embodiments are directed to template based calendar events with graphic enrichment. In some examples, an event creation prompt may be presented upon receiving a request to create a calendar event from a user. The event creation prompt may include a template event selection menu comprising visual aids, such as icons or emojis, that each represent different event templates available for selection. The visual aids for each of the different event templates may be chosen such that contents of the event templates are familiar to users based on the visual aid. For example, a balloon icon or emoji may be chosen to represent an event template for a birthday party. Upon receiving an event template selection, information associated with the user requesting the event or other users such as history, usage, etc. may be retrieved based on the selected event template to infer one or more aspects of the requested event. A suggested event with the inferred aspects may then be presented to the user, where the inferred aspects may include event title, timing, location, and other similar aspects. Upon receiving confirmation and/or modification to the suggested, the event as suggested and/or modified may be added to the user's calendar. Some events may be presented with a visual background, such as an image or graphics, on the calendar for prompt recognition. The image or graphics used as background for events may be created by the calendar application or one of its modules, retrieved from a data store, created by other applications, and so on.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for providing template based calendar events with graphic enrichment. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
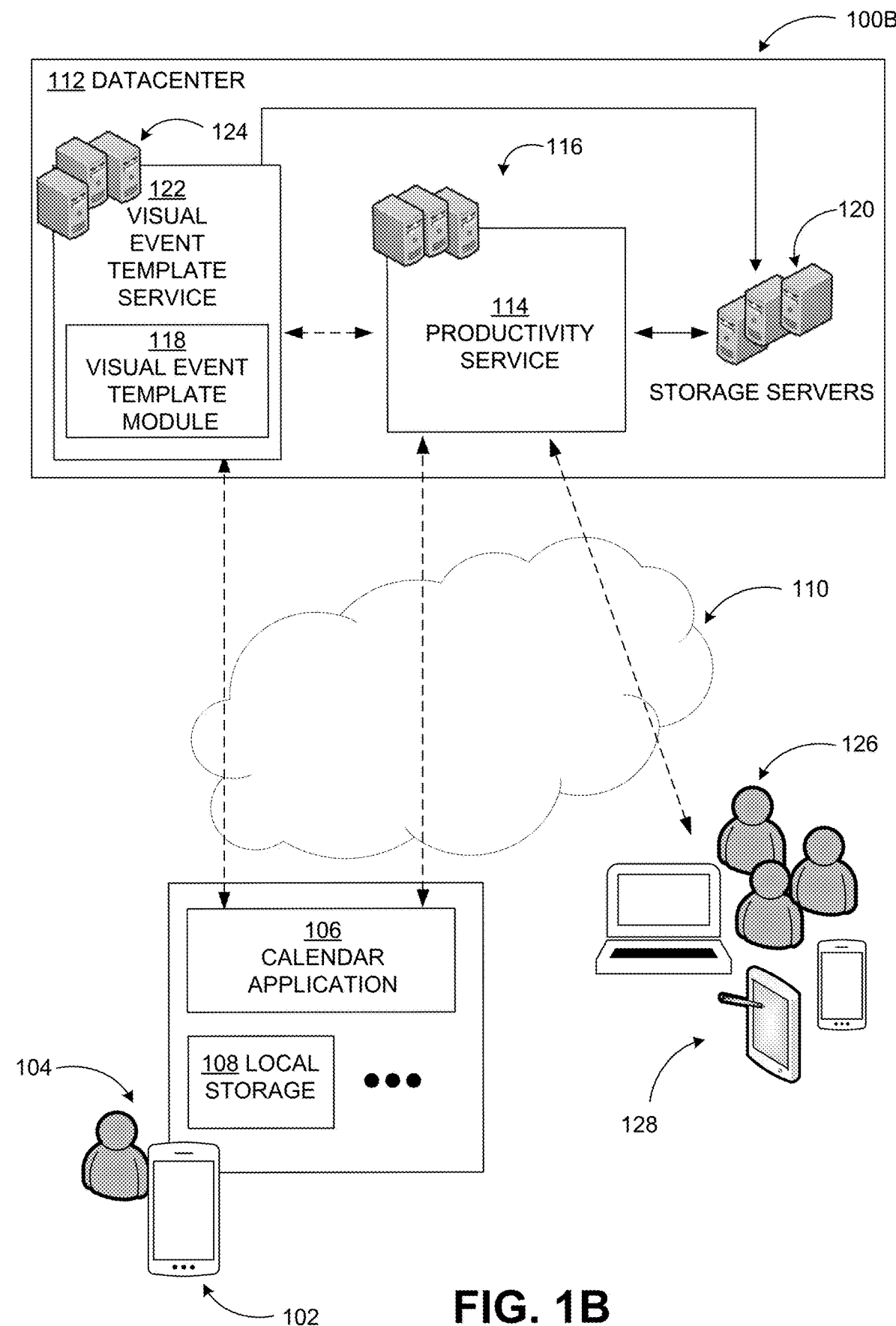

FIGS. 1A through 1B include example network environments where a system to provide template based calendar events with graphic enrichment may be implemented.

As illustrated in diagrams 100A and 100B, an example system may include a datacenter 112 hosting a cloud-based productivity service 114 configured to provide communication, document processing, presentation, calendar management, and comparable services that may be accessed across multiple devices (e.g., device 102 and devices 128) and users (e.g., user 104 and other users 126). The datacenter 112 may include one or more processing servers 116 configured to execute the productivity service 114, among other components. In some embodiments, at least one of the processing servers 116 may be operable to manage the productivity service 114, and data from the device 102 and devices 128 may be stored at storage servers 120 (or associated data stores). As described herein, the productivity service 114 may be implemented as software, hardware, or combinations thereof.

In some embodiments, the productivity service 114 may be configured to interoperate with various applications to provide its services. For example, as illustrated in the diagrams 100A and 100B, the user 104 may execute a thin (e.g., a web browser) or a thick (e.g., a locally installed client application) version of a calendar application 106 through the device 102 with which the productivity service 114 may be configured to integrate and interoperate with over one or more networks, such as network 110. The calendar application 106 may be an application hosted by the productivity service 114, such as a client, for example. In one embodiment, the calendar application 114 may include a visual event template module 118, as illustrated in diagram 100A of FIG. 1A. In another embodiment, as illustrated in diagram 100B of FIG. 1B, the visual event template module 118 may be a separate module associated with and/or executed by one or more processing servers 124 of a visual event template service 122 configured to serve multiple services or applications, such as the productivity service 114 and/or the calendar application 106. The visual event template service 122 may be hosted by a same datacenter as the productivity service 114 (i.e., the datacenter 112 as illustrated). Alternatively, the visual event template service may be hosted by a different datacenter. The device 102 may include a desktop computer, a laptop computer, a tablet computer, a vehicle mount computer, a smart phone, or a wearable computing device, among other similar devices. A communication interface may facilitate communication between the productivity service 114 and the calendar application 106 over the network 110.

In an example embodiment, the user 104 may request to create a calendar event through the calendar application 106 executing on the device 102. Upon receiving the request, the calendar application 106 may present an event creation prompt through a user interface of the calendar application 106 that includes an event template selection control, which upon activation causes an event template selection element, such as a menu, to be displayed. For example, the template selection element may include visual aids, such as icons or emojis, that each represent different event templates available for selection. The visual aids may be selected such that contents of event templates are familiar to the user 104 based on the visual aid. For example, a visual aid of a music note may represent an event template for music lessons. Additionally, the visual aids may be Unicode characters such that different platforms may render them consistently and interpret them as an event template, allowing uniformity across devices and platforms when interacting with the calendar application 106. Upon receiving an event template selection from the user 104 through the user interface, information associated with the user 104 or others such as history, usage, etc. may be retrieved by the productivity service 114 to infer one or more aspects of the requested event and the calendar application 106 may present a suggested event to the user 104 based on the inferred aspects. The inferred aspects may include title, timing, location, and similar ones.

Upon receiving confirmation and/or modification to suggested event, the calendar application 106 may add the event to the user's calendar. The data associated with the added event may be stored locally at local storage 108 of the device 102 and/or stored remotely at the storage servers 120. Some events may be presented with a visual background such as an image or graphics on the calendar for prompt recognition. The user 104 may select and/or modify the visual background. The event may then be transmitted, if necessary, by the productivity service 114 to the devices 128 of one or more other users 126 associated with the event.

A system according to embodiments allows template based calendar events with graphic enrichment by presenting template events with visual aids and inferring aspects of events for suggestion based on a user's or other users' usage, history, and similar information. By allowing focused and efficient presentation of information on calendars, collaboration and efficiency may be increased, local and cloud computing resource usage may be reduced, bandwidth usage may be reduced, and security may be increased.

For example, through the template based selection, it may be easier for users to add events to the calendar by reducing the number of steps required to create an event. When adding a new event based on an event template, users may not have to fill in event title, location, timing, or other details as these values may be pre-defined based on the event template selected. Also, user preferences for the time and/or location of specific events may be learned over time and, with repeated use of the same template event, auto-population of the fields may be enabled to more quickly create events that have been created previously. This is an improvement from conventional calendar applications through which users must manually enter information in all fields, including title, duration, and location, when creating new events.

Additionally, in conventional calendar applications, events are displayed on the calendar surface mainly based on text and users have to read the text to differentiate one type of event from another. Here, embodiments enable users to select the type of event they want to create from a curated set of visual aids (e.g., a birthday party icon, a doctor appointment emoji, or a soccer game practice image). When users add a new event based on an event template, they may see a photo or illustration that represents the event on the calendar. This may enable users to perform a quick visual scan of the calendar surface to locate events of the same type and may add more visual interest to the calendar surface. Moreover, the visual aids may be Unicode characters, meaning different platforms may render them consistently and interpret them as a template, which allows cross-platform uniformity.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with large numbers of devices and users managing scheduling information.

Figure 2:
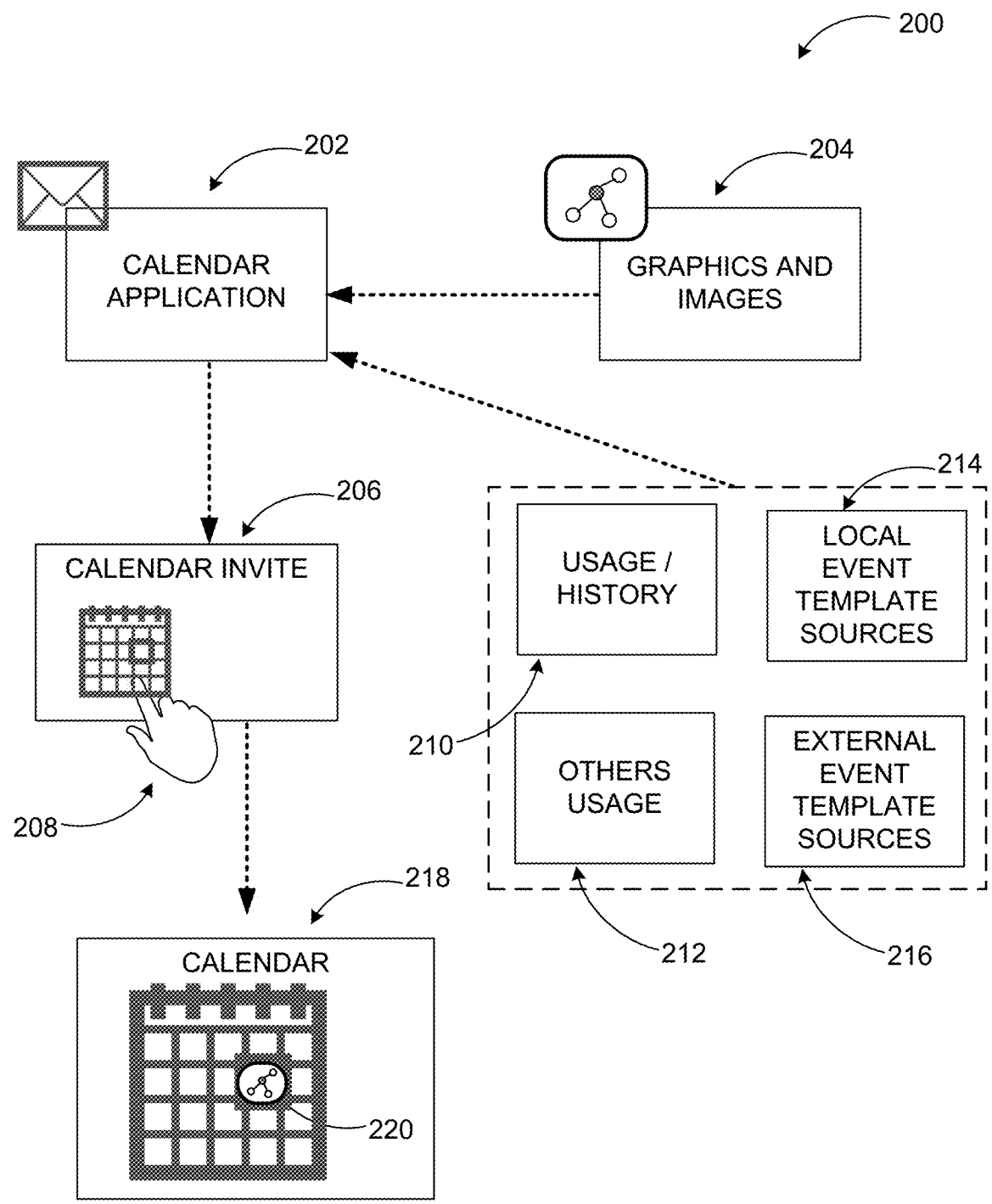
FIG. 2 illustrates conceptually how template based calendar events with graphic enrichment may be implemented.

FIG. 2 illustrates conceptually how template based calendar events with graphic enrichment may be implemented.

As shown in diagram 200, a calendar application 202 (or a visual template module within the calendar application 202) may receive a request from a user to generate a calendar event such as a meeting, an appointment, a scheduled task, and comparable ones. Upon receiving the request, the calendar application 202 may present a calendar invite 206 that includes an event template selection element, such as a menu, for example. According to embodiments, the calendar application 202 may maintain a number of pre-defined event templates, each represented by a visual aid, to be presented within the template event selection element. The event templates may be provided by a manufacturer of the calendar application 202 and/or added over time by the user or automatically by the calendar application 202 based on analysis of user behavior. The event templates provided by the manufacturer may be a default template set. However, the user or calendar application 202 may be enabled to one of modify the event templates in the default template set and/or add new event templates to the default template set. For example, if the user has repeating events (e.g., meetings, appointments, etc.) with predictable aspects (e.g., timing, location), such events may be used to create new event templates. Moreover, the visual aids representing each of the event templates may allow users to identify a template event promptly. For example, the visual aids may include icons, emojis, or other similar elements contextually corresponding to event template it represents (e.g., a dog emoji representing a veterinary appointment). The visual aids may be stored in a graphics and images store 204 associated with the calendar application 202.

Upon presenting the visual aids within the event template selection element of the calendar invite 206 and receiving a selection 208, the calendar application 202 may infer one or more aspects of the requested event based on the particular user's history and usage 210, other users' history and usage 212 (similar to crowd sourcing), local event template sources 214, and external event template sources 216. Local event template sources 214 may include templates prepared by an organization for their repeated meetings or activities, for example. For external event template sources 216, third parties may submit templates to be used for events involving them. For example, a coffee store may provide an event template with its logo, links to pre-ordering coffee, and making payments.

The calendar application 202 may present a suggested event with aspects or details of the event filled based on the inference from the different sources discussed above. The suggested event may be presented within the calendar invite 206. In an example scenario, if the user has regular doctor's appointments with a particular physician, upon detecting an event creation request for a time when the user usually has their doctor's appointment, the calendar application 202 may present the suggested event with a title, timing, and location pre-filled for the doctor's appointment. The visual aid representing the suggested event may include an icon or emoji associated with a physician, for example.

The user may accept the suggested event or make modifications to it. Upon user acceptance or modification, the calendar application 202 may present the confirmed and/or modified event 220 on the user's calendar 218. For further distinction and ease of identification, the confirmed and/or modified event 220 may be presented with a background image or graphic related to the event's nature (e.g., doctor's appointment). Thus, by looking at their calendar for a particular day or week, the user may be able to immediately detect particular events.

Figure 3:
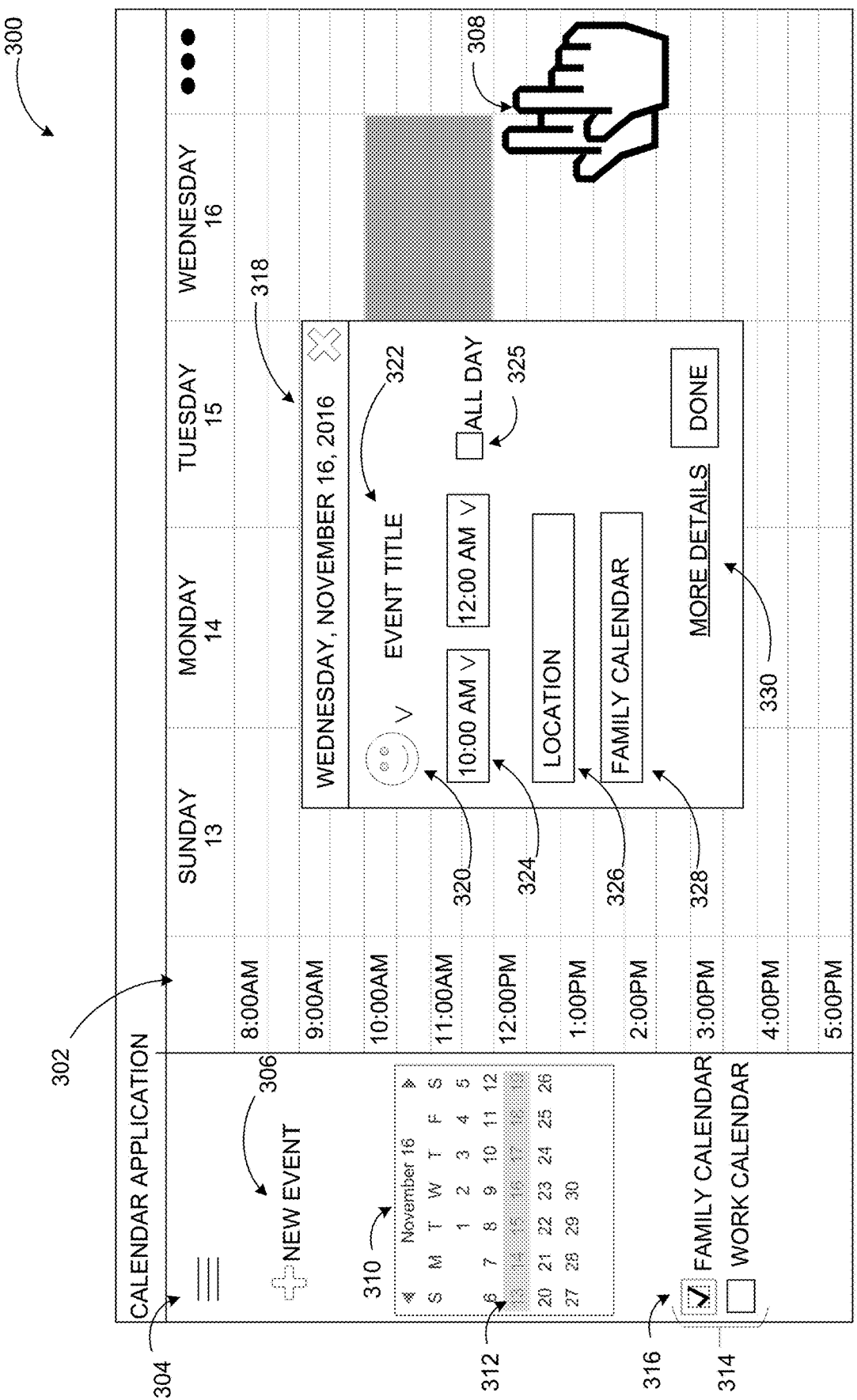
FIG. 3 illustrates an example calendar application user interface where template based calendar events with graphic enrichment may be created.

FIG. 3 illustrates an example calendar application user interface where template based calendar events with graphic enrichment may be created.

An example calendar application user interface 300 in FIG. 3 may display a user's scheduled events such as appointments, meetings, and so on within a calendar 302. The calendar 302 may be displayed in a monthly view, a weekly view (as illustrated), or a daily view, among other similar types of views. The weekly view may be comprised of columns to represent each day of the week and rows to represent time slots throughout a day. To add a new event to the calendar 302, a user may activate a specific control element 306 located within a tool bar 304 of the calendar application user interface 300, double-click on a time slot 308 (as illustrated), or perform a comparable action, which may result in the display of the event creation prompt 318.

The tool bar 304 may also display a thumbnail calendar 310 that may indicate via shading, highlighting, or other similar visual representation 312 the day, week, or month being displayed in the calendar 302. Additionally, a visual display of the number representing each date in the thumbnail calendar may also indicate whether there is an event scheduled on that date. For example, if the number is bolded in comparison to the other numbers, there may be an event scheduled on the corresponding date. Moreover, the user may select a date from the thumbnail calendar 310 to have that particular date displayed on the calendar 302. The tool bar 304 may further include a list 314 of each calendar associated with the user, such as a family calendar and a work calendar. A checkmark 316 next to a particular calendar on the list 314 may indicate that the particular calendar is being displayed within the calendar 302. In some examples, more than one calendar may be displayed at a time.

According to embodiments, the event creation prompt 318 may include fillable fields such as an event title field 322 (i.e., subject of the event), event timing fields 324 (e.g., date, start time, and end time), and an event location field 326. For the event timing fields 324, an option to select "all day" 325 as opposed to a start time and an end time may also be provided. The event creation prompt 318 may also include a calendar type field 328 (e.g., family calendar and work calendar). This field may be automatically populated to correspond to the type of calendar being displayed when the user requests to add the new event to the calendar 302. In other examples, additional fields such as attendees for a meeting, type of event, and other information may also be requested. These additional fields may be requested by selecting the "more details" link 330 within the event creation prompt 318.

The event creation prompt 318 may also include a visual selection control 320 that allows the user to activate an event template selection element, such as a menu. Upon activation of the event template selection element, a number of graphic visual aids (e.g., icons or emojis) representing pre-defined event templates may be displayed such that the user can select a visual aid corresponding to a desired event template, as described infra in conjunction in FIGS. 4A through 4D. The user may have the option of selecting a visual aid from the visual selection menu to be added adjacent to the event title field 322. The curated set of visual aids may be related to event types consumers typically create. For example, they may be related to: music, celebrations, flight, travel, vacation, pets (e.g., kittens, puppies), studying/work/school, coffee, tea, meals, baseball, soccer, basketball, football, exercise, car, phone calls, credit cards, movies, medical appointments, and comparable ones. In other examples, the calendar application may learn from user behavior or using information from other resources and suggest an event template upon selection of the timeslot for the event.

In an example scenario, if the user selects a visual aid from the event template selection element for the first time, the calendar application may suggest values for the fillable fields, so the user does not have to input the values. For example, the user may double click on a particular time slot, be presented with an event creation prompt, and select an event template selection control within the event creation prompt to activate the event template selection element. If the user selects a coffee emoji as a visual aid from the event template selection element, the event title field may be automatically filled with "Coffee" and the duration may be estimated as 30 minutes such that the end timing field may be automatically set to a time 30 minutes after the particular time slot selected upon creation of the event. The user may also have the option of changing any of these automatically filled fields. If the user then re-selects the coffee emoji for a subsequent event, the calendar application may remember the event title and duration, and may suggest a nearby or recently-used location. Because the calendar application knows the event is related to coffee, it may set the background of the event to a picture of coffee or a coffee store.

The example user interfaces, elements, configurations, and layouts in FIG. 3 and subsequent figures are for illustration purposes. Other user interfaces, elements, configurations, and layouts may be used to implement embodiments. Furthermore, various color, shading, textual, graphic, and highlighting schemes may be used to enhance and complement the features discussed herein.

FIG. 4A through 4D illustrate example calendar application user interfaces following creation of a calendar event employing template based calendar events with graphic enrichment.

Figure 4A:
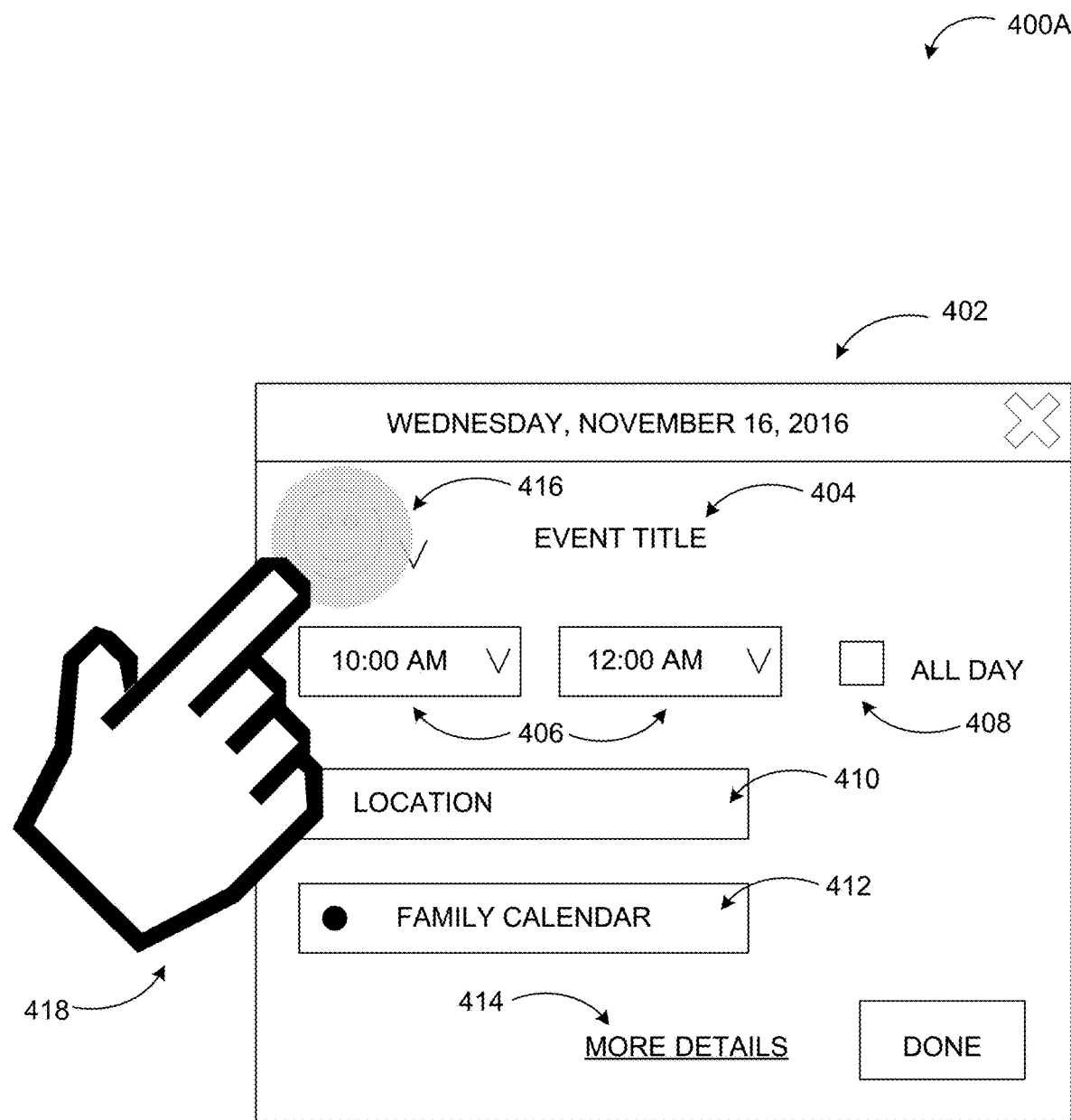
FIG. 4A through 4D illustrate example calendar application user interfaces following creation of a calendar event employing template based calendar events with graphic enrichment.

User interface 400A in FIG. 4A is an example first stage of generating a calendar event. Upon requesting to create a new event in a calendar application by double clicking a particular timeslot within a displayed calendar, for example, a user may be presented with an event creation prompt 402. The event creation prompt 402 may include fillable fields, such as an event title field 404, event timing fields 406 (e.g., start time and end time to indicate duration), and an event location field 410. For the event timing fields 406, an option to select "all day" 408 as opposed to a start time and an end time may also be provided. The event creation prompt 402 may also include a calendar type field 412 (e.g., family calendar and work calendar). This field may be automatically populated to correspond to the type of calendar being displayed when the user requests to add the new event. In other examples, additional fields such as attendees for a meeting, type of event, and other information may also be requested. These additional fields may be requested by selecting the "more details" link 414 within the event creation prompt 402. The event creation prompt 402 may also include an event template selection control 416

Upon being presented with the event creation prompt 402, the user may activate 418 the event template selection control 416. In some embodiments, a visual aid of an inferred event template based on user selected timing may be suggested on the event creation prompt 402. For example, if the user has regular personal training appointments at a particular gym, upon detecting an event creation request for a time when the user usually has their personal training appointment, a visual aid, such as a barbell, of an inferred event template for exercise may be suggested with a title, timing, and gym location pre-filled for the personal training appointment. In other embodiments, the user may select from a list of available visual aids and thereby available event templates, as described in FIG. 4B.

Figure 4B:
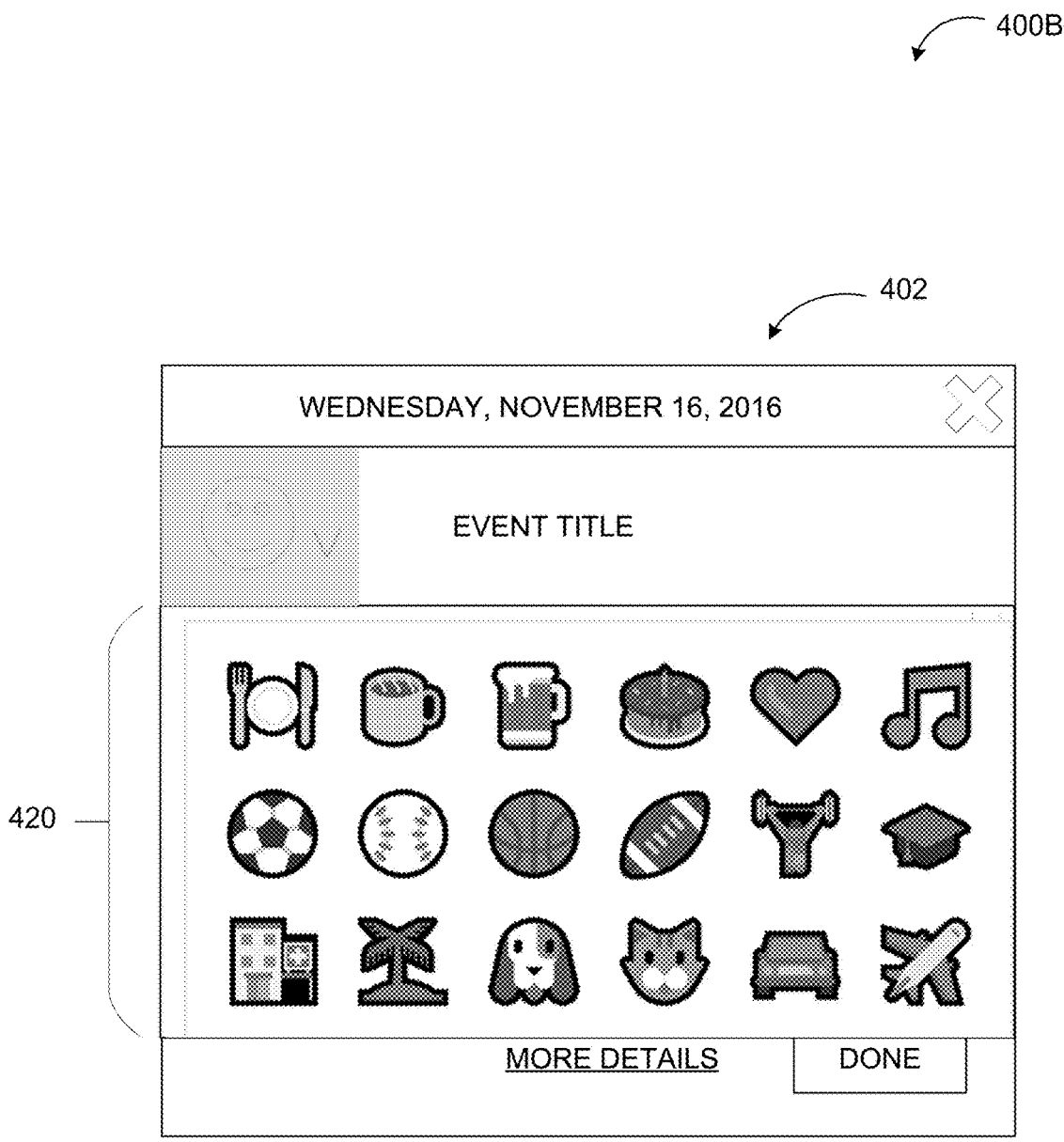

User interface 400B in FIG. 4B illustrates an event template selection menu 420 displayed upon activation of the event template selection control described in conjunction with FIG. 4A. The event template selection menu 420 may present a list of available visual aids, such as emojis, such that the user may select a visual aid corresponding to a desired pre-defined event template. Emojis are Unicode characters, meaning different platforms may render them consistently. In some examples, the calendar application may insert the emoji to the beginning of the subject string (event title field), and any other calendar application or web browser may interpret it correctly. Similarly, if the user creates an event with a template emoji in the subject string on another platform, the calendar application may interpret it as a template. While emojis are used for illustration purposed in FIG. 4B through 4D, icons or other graphic/image based representations may also be used to select event templates.

Figure 4C:
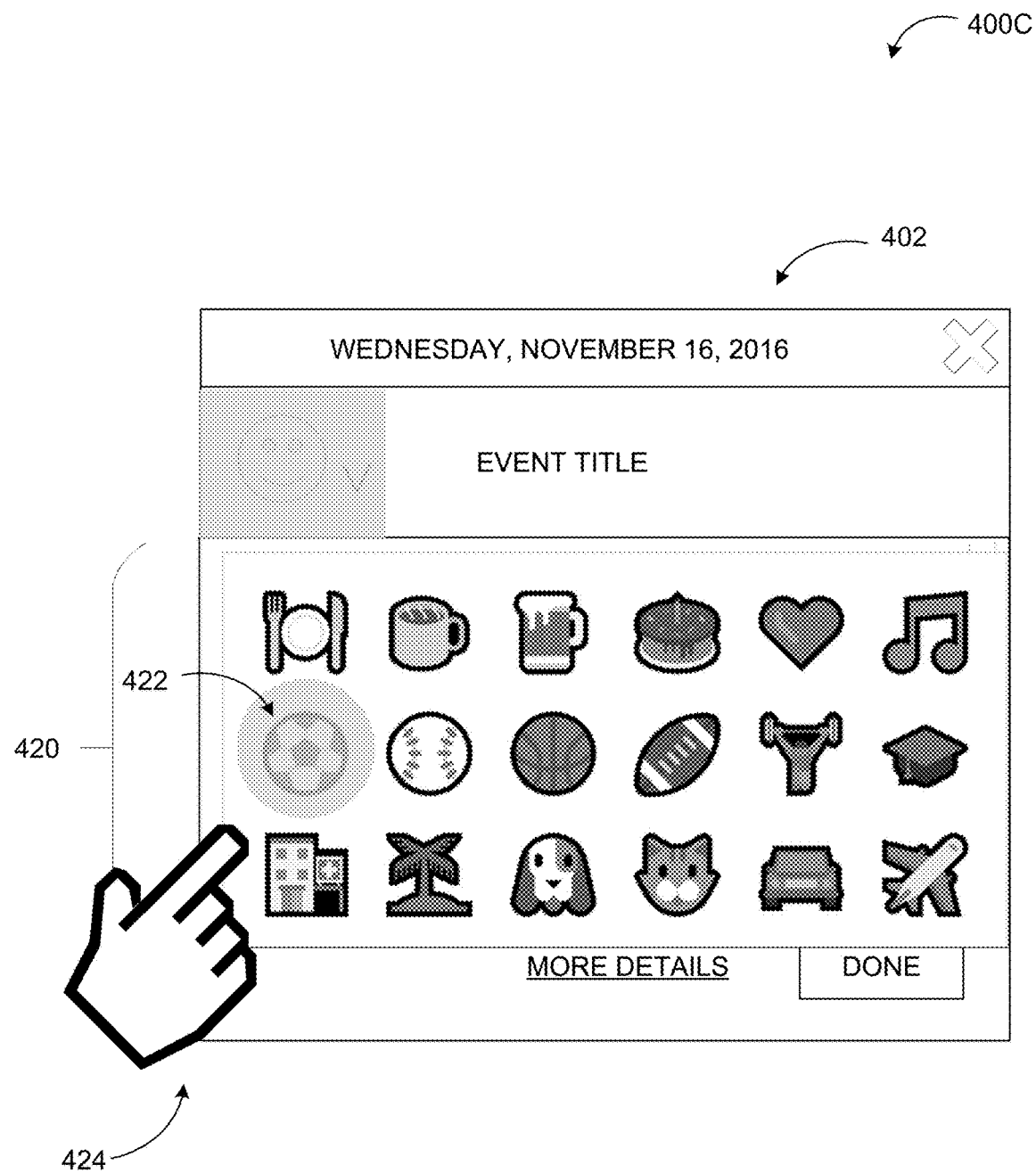

User interface 400C in FIG. 4C shows a user selection 424 of a visual aid 422 among the presented list of visual aids corresponding to different event templates within the event template selection menu 420. The visual aids may be chosen as commonly known items such that a user can identify a template event easily by looking at the representing visual aid. In the example of FIG. 4C, the selected visual aid 422 is a soccer ball representing a soccer game event.

Figure 4D:
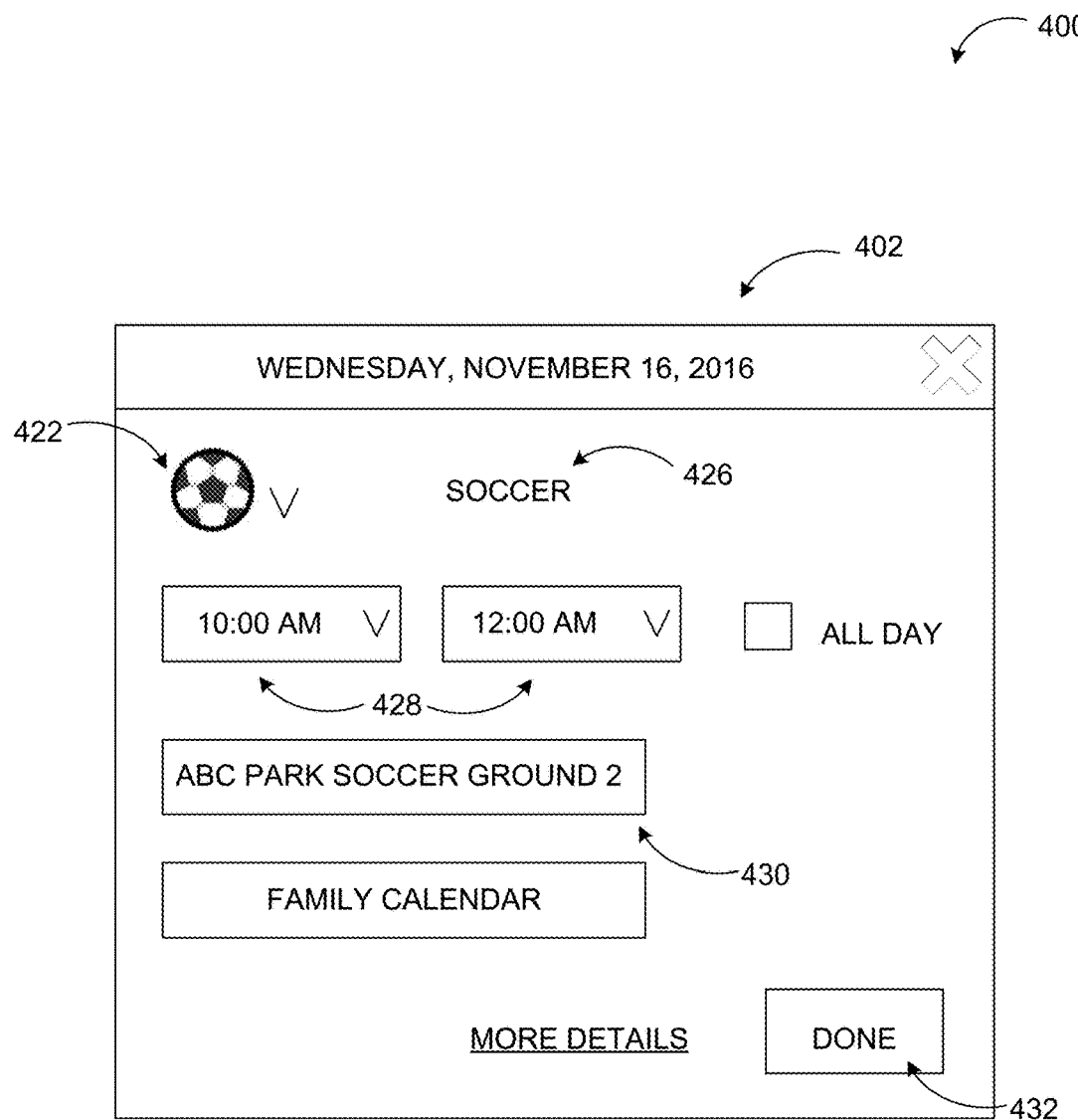

User interface 400D in FIG. 4D illustrates how the fields of the event creation prompt 402 may be pre-filled based on a user selected event template (i.e., the soccer game event) following the selection of the visual aid 422 in FIG. 4C. The selected visual aid 422 may replace the event template selection control (see element 416 in FIG. 4A) within the event creation prompt 402. The event title field may be pre-filled as "Soccer" 426, and the event timing fields may be pre-filled 428 based on user selection or inference. For example, the event timing fields may be pre-filled 428 based on past soccer event timings associated with the user discovered in the user's history. However, if no history is able to be retrieved regarding past soccer event timings associated with the user, at least a suggested duration may be provided. The event location field may also be pre-filled 430 based on the history of the user or external data sources (e.g., a listing of nearby soccer games at the designated time). Other fillable/pre-filled fields may include, but are not limited to, free/busy state of the event, attendees of the event, reminder time of the event, description of the event, private/public state of the event, etc. The user may also have the option of changing any of these pre-filled fields. To confirm the event with the pre-filled fields and/or once the pre-filled fields have been modified to the user's content, the user may activate the "done" control element 432.

Figure 5:
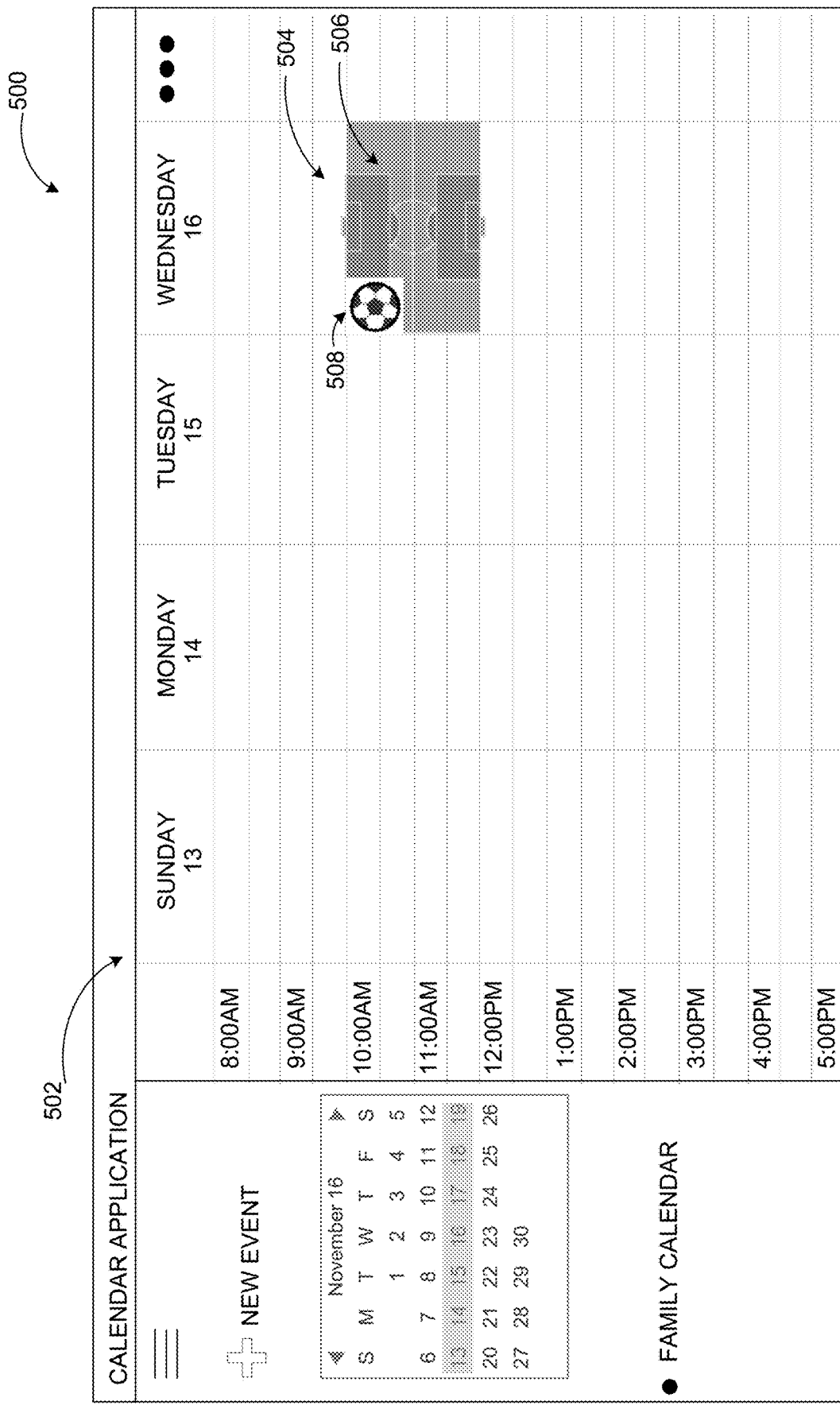
FIG. 5 illustrates an example calendar application user interface with a template based event displayed using graphic background visualization.

FIG. 5 illustrates an example calendar application user interface with a template based event displayed using graphic background visualization.

Example calendar application user interface 500 in FIG. 5 shows a further enhancement of user experience, where presentation of scheduled events within a calendar 502 displayed through the calendar application user interface 500 may be enriched with graphic visual aids such as background images or graphics that are associated with the event. As shown in the example, an event 504 representing a scheduled soccer game may be displayed with a background image or graphic 506 on the calendar 502 instead of (or in addition to) textual description. In the example, a soccer field image is used to distinguish the event 504, thus, allowing users to distinguish particular events from others and be able to identify them at first glance. Additionally, a visual aid 508, such as a soccer ball, selected for the event through means described supra in conjunction with FIGS. 4A through 4D may be displayed in conjunction with the soccer field image to further distinguish the event. In some examples, the user may select and/or modify the background images or graphics.

In other embodiments, additional information may be displayed using a textual, graphic, shading, color, or highlighting scheme. For example, a colored bar along one wide of the event may indicate free/busy status. Additional text may be displayed associated with the event. Shading or coloring may be used to indicate different attributes associated with the event.

The examples provided in FIGS. 1 through 5 are illustrated with specific systems, services, applications, modules, visual aids, and user interfaces. Embodiments are not limited to environments according to these examples. Template based calendar events with graphic enrichment may be implemented in environments employing fewer or additional systems, services, applications, modules, visual aids, and user interfaces. Furthermore, the example systems, services, applications, modules, visual aids, and user interfaces s shown in FIG. 1 through 5 may be implemented in a similar manner with other values using the principles described herein.

Figure 6:
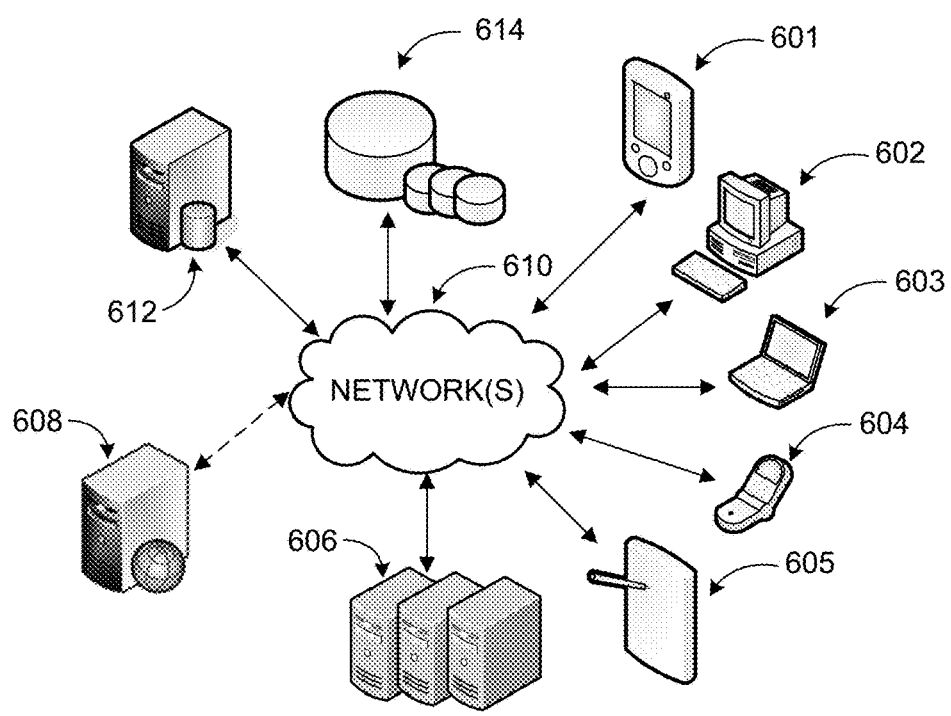
FIG. 6 is a networked environment, where a system according to embodiments may be implemented.

FIG. 6 is a networked environment, where a system according to embodiments may be implemented. In addition to locally installed applications (for example, the calendar application 106), template based calendar events with graphic enrichment may also be employed in conjunction with hosted applications and services (for example, a productivity service 114 and/or visual event template service 122) that may be implemented via software executed over one or more servers 606, individual server 608, or at client devices, as illustrated in diagram 600. A hosted service or application may communicate with client applications on individual computing devices such as a handheld computer 601, a desktop computer 602, a laptop computer 603, a smart phone 604, a tablet computer (or slate), 605 ('client devices') through network(s) 610 and control a user interface presented to users.

Client devices 601-605 are used to access the functionality provided by the hosted service or application. One or more of the servers 606 or server 608 may be used to provide a variety of services as discussed above. Relevant data such as calendar data, and similar may be stored in one or more data stores (e.g. data store 614), which may be managed by any one of the servers 606 or by database server 612.

Network(s) 610 may comprise any topology of servers, clients, Internet service providers, and communication media. A system according to embodiments may have a static or dynamic topology. Network(s) 610 may include a secure network such as an enterprise network, an unsecure network such as a wireless open network, or the Internet. Network(s) 610 may also coordinate communication over other networks such as PSTN or cellular networks. Network(s) 610 provides communication between the nodes described herein. By way of example, and not limitation, network(s) 610 may include wireless media such as acoustic, RF, infrared and other wireless media.

Many other configurations of computing devices, applications, engines, data sources, and data distribution systems may be employed for providing template based calendar events with graphic enrichment. Furthermore, the networked environments discussed in FIG. 6 are for illustration purposes only. Embodiments are not limited to the example applications, engines, or processes.

Figure 7:
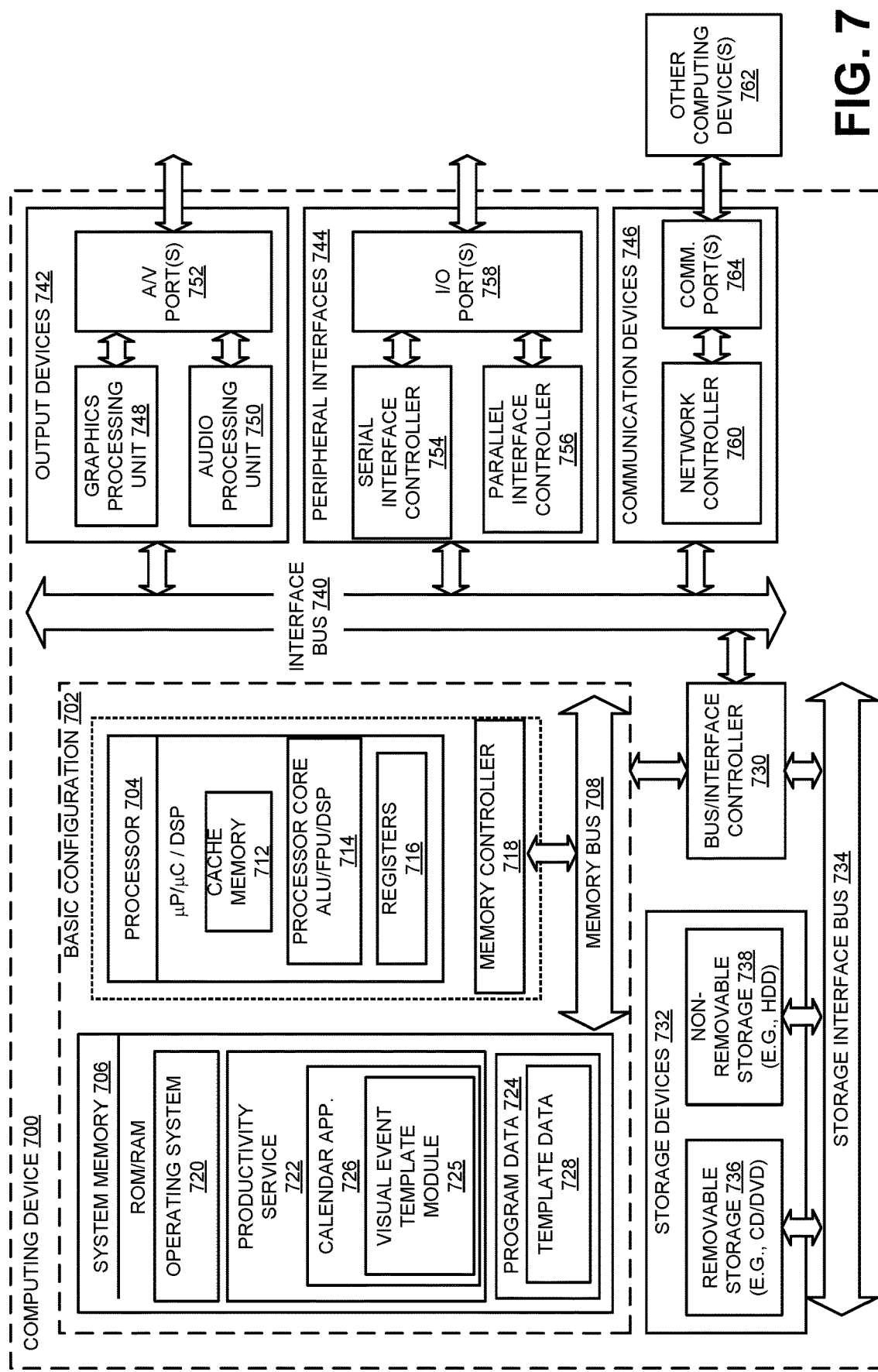
FIG. 7 is a block diagram of an example general purpose computing device, which may be used to provide template based calendar events with graphic enrichment.

FIG. 7 is a block diagram of an example general purpose computing device, which may be used to provide template based calendar events with graphic enrichment.

For example, computing device 700 may be used as a server, desktop computer, portable computer, smart phone, special purpose computer, or similar device. In an example basic configuration 702, the computing device 700 may include one or more processors 704 and a system memory 706. A memory bus 708 may be used for communicating between the processor 704 and the system memory 706. The basic configuration 702 is illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The example processor cores 714 may (each) include an arithmetic logic unit (ALU), a floating point unit (FPU), a digital signal processing core (DSP Core), or any combination thereof. An example memory controller 718 may also be used with the processor 704, or in some implementations the memory controller 718 may be an internal part of the processor 704.

Depending on the desired configuration, the system memory 706 may be of any type including but not limited to volatile memory (such as RAM), non-volatile memory (such as ROM, flash memory, etc.) or any combination thereof. The system memory 706 may include an operating system 720, a productivity service 722, a calendar application 726, a visual event template module 725, and program data 724. The visual event template module 725 may present visual aids for selection, retrieve information associated with a user requesting the event based on a visual aid selected to infer one or more aspects of the event, present suggestions for events based on the inferred aspects for confirmation or modification, and present the confirmed or modified events using graphic enrichment on a calendar managed by the calendar application 726. The program data 724 may include, among other data, template data 728, as described herein.

The computing device 700 may have additional features or functionality, and additional interfaces to facilitate communications between the basic configuration 702 and any desired devices and interfaces. For example, a bus/interface controller 730 may be used to facilitate communications between the basic configuration 702 and one or more data storage devices 732 via a storage interface bus 734. The data storage devices 732 may be one or more removable storage devices 736, one or more non-removable storage devices 738, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the basic configuration 702 via the bus/interface controller 730. Some of the example output devices 742 include a graphics processing unit 748 and an audio processing unit 750, which may be configured to communicate to various external devices such as a display or speakers via one or more A/V ports 752. One or more example peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 746 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 700 may be implemented as a part of a general purpose or specialized server, mainframe, or similar computer that includes any of the above functions. The computing device 700 may also be implemented as a personal computer including both laptop computer and non-laptop computer configurations.

Example embodiments may also include methods to provide template based calendar events with graphic enrichment. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
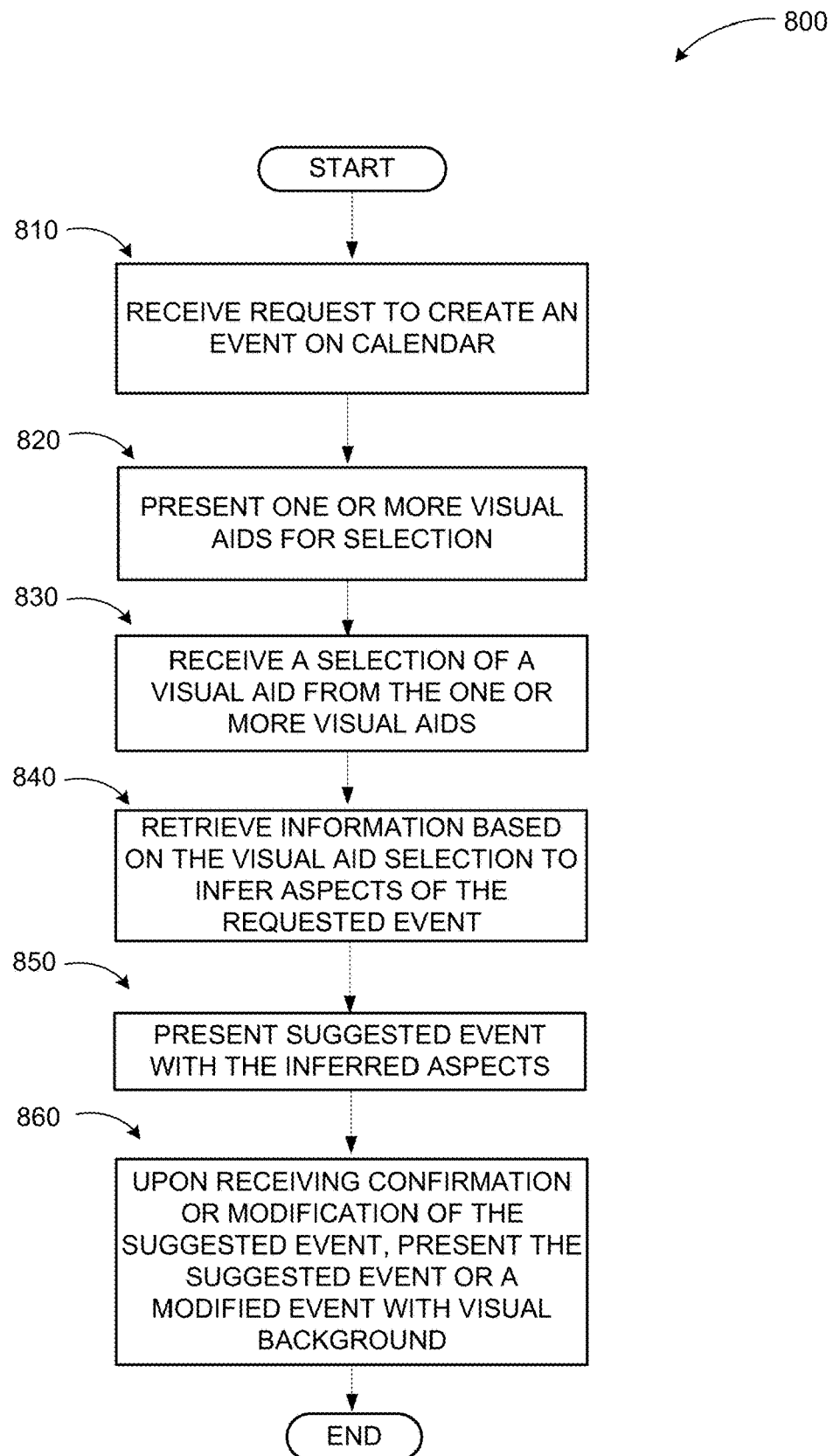
FIG. 8 illustrates a logic flow diagram of a method to provide template based calendar events with graphic enrichment.

FIG. 8 illustrates a logic flow diagram of a method to provide template based calendar events with graphic enrichment.

Process 800 may be implemented on a computing device, server, or other system. An example system may include a computer communicatively coupled to a cloud server hosting a productivity or a calendar management service.

Process 800 begins with operation 810, where a request to create an event on a calendar may be received. At operation 820, one or more visual aids may be presented for selection. Each visual aid may represent one or more template events and may include an icon or an emoji. The icon or emoji may be selected such that users can be familiar with the template event that it represents.

At operation 830, a visual aid selection may be received. Information associated with a user requesting the event may be retrieved based on the visual aid selection to infer one or more aspects of the event at operation 840. At operation 850, a suggested event with the inferred aspects or details may be presented and upon receiving user confirmation and/or modification to inferred aspects of the requested event, the event as confirmed and/or modified may be added to the user's calendar with a visual background presentation at operation 860.

The operations included in process 800 are for illustration purposes. Template based calendar events with graphic enrichment may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some embodiments, means to provide template based calendar events with graphic enrichment are provided. Example means may include receiving a request to create an event on a calendar, presenting one or more visual aids for selection, receiving a selection of a visual aid from the visual aids, and retrieving information associated with a user requesting the event based on the visual aid selection to infer one or more aspects of the event. The example means may also include presenting a suggested event with the inferred aspects, receiving one of a confirmation and a modification to the suggested event; and presenting one of the suggested event on the calendar if the confirmation is received and a modified event on the calendar if the modification is received.

According to some examples, methods to provide template based calendar events with graphic enrichment are provided. An example method may include receiving a request to create an event on a calendar, presenting one or more visual aids for selection, receiving a selection of a visual aid from the visual aids, and retrieving information associated with a user requesting the event based on the visual aid selection to infer one or more aspects of the event. The example method may also include presenting a suggested event with the inferred aspects, receiving a confirmation or a modification to the suggested event, and presenting the suggested event on the calendar if the confirmation is received or a modified event on the calendar if the modification is received.

In other examples, the suggested event or the modified event may be presented with a graphic or an image as background on the calendar, where the graphic or the image may be associated with the suggested event or modified event. The visual aids may represent one or more event templates and may include icons or emojis. The icons or the emojis may be selected such that corresponding event templates are promptly identifiable. Presenting the suggested event with the inferred aspects may include pre-filling a title field, a timing field, a location field, free/busy state field, an attendee field, a reminder time field, a description field, and/or a private/public state field.

In further examples, the aspects of the event may be inferred from one or more of a usage history of the user, a usage history of one or more other users, a local event template source, and/or an external event template source. The external event template source may include a third party service that provides one or more event templates as a promotion. The local event template source may include an organizational data store of organizational activities and meetings. The event may be a meeting, an appointment, or a scheduled task.

According to some embodiments, computing devices to provide template based calendar events with graphic enrichment may be described. An example computing device may include a communication interface configured to facilitate communication between the computing device and one or more servers associated with a productivity service, a memory configured to store instructions, and one or more processors coupled to the memory. The processors, in conjunction with the instructions stored in the memory, may be configured to execute components of a calendar service, the components of the calendar service comprising a calendar application configured to facilitate scheduling of events and meetings in conjunction with the productivity service, and a visual event template module. The visual event template module may be configured to receive a request to create an event on a calendar, present one or more visual aids for selection, receive a selection of a visual aid from the visual aids, and retrieve information associated with a user requesting the event based on the visual aid selection to infer one or more aspects of the event. The visual event template module may also be configured to present a suggested event with the inferred aspects, receive a confirmation or a modification to the suggested event, and present the suggested event on the calendar if the confirmation is received or a modified event on the calendar if the modification is received, where the suggested event or the modified event is presented with a graphic or an image that may be associated with the suggested event or the modified event as background on the calendar.

In other embodiments, a plurality of event templates, each template represented by one of the visual aids, may be received as a default template set; and the user may be enabled to modify the event templates in the default template set or add new event templates to the default template set. The user's behavior may be analyzed in scheduling events, and a new event template may be created based on the analysis. The new event template may be created based on determination of repetitive events and one or more aspects of the repetitive events. The user may be enabled to select or modify the graphic or the image used as the background. One or more of a shading scheme, a highlighting scheme, a color scheme, and a textual scheme may be employed to present additional information associated with the event.

According to some examples, systems to provide template based calendar events with graphic enrichment may be described. An example system may include a first server configured to execute a productivity service, a second server configured to execute a calendar service, and a third server configured to execute a visual event template service. The visual event template service may be configured to receive a request to create an event on a calendar from the calendar service, provide one or more visual aids to be displayed by the calendar service for selection, where each of the one or more visual aids represents an event template, receive a selection of a visual aid from the one or more visual aids, and retrieve information associated with a user requesting the event based on the visual aid selection to infer one or more aspects of the event. The visual event template service may also be configured to provide a suggested event with the inferred aspects to be displayed by the calendar service, receive a confirmation or a modification to the suggested event, and provide the suggested event on the calendar if the confirmation is received or a modified event on the calendar if the modification is received to be displayed by the calendar service, where the suggested event or the modified event is provided with a graphic or an image that may be associated with the suggested event or the modified event as background on the calendar.

In other examples, the user's behavior may be learned and new event templates may be created based on the learning. The event templates may be integrated with a location service. The event templates may be stored in one of a separate data store and in a calendar data store associated with the calendar service. The visual aids representing each of the event templates may be Unicode characters such that different platforms and devices interpret and render the visual aids consistently.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide template based calendar events with graphic enrichment, the computing device comprising:
   a communication interface configured to facilitate communication between the computing device and one or more servers associated with a productivity service;
   a memory configured to store instructions; and
   one or more processors coupled to the memory, wherein the one or more processors, in conjunction with the instructions stored in the memory, are configured to execute components of a calendar service, the components of the calendar service comprising:
   a calendar application configured to facilitate scheduling of events and meetings in conjunction with the productivity service; and
   a visual event template module configured to:
      receive a request to create an event on a calendar;
      enable display of one or more visual aids for selection wherein each of the one or more visual aids is a non-text graphical element;
      receive a selection of a visual aid from the one or more visual aids;
      retrieve information associated with a user requesting the event based on the visual aid selection;
      infer one or more aspects of the event based on the information associated with the user requesting the event;
      enable display of a suggested event, the suggested event determined by the calendar application and including fillable fields for defining the suggested event, at least one of the fillable fields being pre-filled with the one or more inferred aspects;
      receive a confirmation of the suggested event; and
      responsive to receiving the confirmation, enable display of the suggested event on the calendar.

2. The computing device of claim 1, wherein the one or more processors are configured to enable display of the suggested event with one of a graphic and an image associated with the suggested event as background on the calendar.

3. The computing device of claim 2, wherein the visual event template module is further configured to:
   enable the user to select or modify the one of the graphic and the image used as the background.

4. The computing device of claim 1, wherein the visual event template module is further configured to:
   receive a plurality of event templates, each event template represented by a visual aid, as a default template set; and
   enable the user to perform an action selected from a group consisting of modifying the event templates in the default template set and adding new event templates to the default template set.

5. The computing device of claim 1, wherein the visual event template module is further configured to:
   analyze a behavior of the user in scheduling events; and
   create a new event template based on the analysis.

6. The computing device of claim 5, wherein the visual event template module is configured to create the new event template based on a determination of repetitive events and one or more aspects of the repetitive events.

7. The computing device of claim 1, wherein the visual event template module is further configured to:
   employ at least one selected from a group consisting of a shading scheme, a highlighting scheme, a color scheme, and a textual scheme to enable display of additional information associated with the suggested event.

8. The computing device of claim 1, wherein the one or more visual aids represent one or more event templates for selection and include at least one selected from a group consisting of an icon and an emoji.

9. The computing device of claim 1, wherein the fillable fields include at least one selected from a group consisting of a title field, a timing field, a location field, a free/busy state field, an attendee field, a reminder time field, a description field, and a private/public state field.

10. The computing device of claim 1, wherein the one or more processors are configured to infer the one or more aspects of the event from at least one selected from a group consisting of a usage history of the calendar application by the user, a usage history of the calendar application by one or more other users, a local event template source, and an external event template source.

11. A computing device to provide template based calendar events with graphic enrichment, the computing device comprising:
    a communication interface configured to facilitate communication between the computing device and one or more servers associated with a productivity service;
    a memory configured to store instructions; and
    one or more processors coupled to the memory, wherein the one or more processors, in conjunction with the instructions stored in the memory, are configured to execute components of a calendar service, the components of the calendar service comprising:
    a calendar application configured to facilitate scheduling of events and meetings in conjunction with the productivity service; and
    a visual event template module configured to:
       receive a request to create an event on a calendar;
       enable display of one or more visual aids for selection wherein each of the one or more visual aids is a non-text graphical element;
       receive a selection of a visual aid from the one or more visual aids;
       retrieve information associated with a user requesting the event based on the visual aid selection;
       infer one or more aspects of the event based on the information associated with the user requesting the event;
       enable display of a suggested event, the suggested event determined by the calendar application and including fillable fields for defining the suggested event, at least one of the fillable fields being pre-filled with the one or more inferred aspects;

receive a modification to the suggested event; and
responsive to receiving the modification, enable display of a modified event on the calendar.

12. The computing device of claim 11, wherein the one or more processors are configured to enable display of the modified event with one of a graphic and an image associated with the modified event as background on the calendar.

13. The computing device of claim 12, wherein the visual event template module is further configured to:
enable the user to select or modify the one of the graphic and the image used as the background.

14. The computing device of claim 11, wherein the visual event template module is further configured to:
receive a plurality of event templates, each event template represented by a visual aid, as a default template set; and
enable the user to perform an action selected from a group consisting of modifying the event templates in the default template set and adding new event templates to the default template set.

15. The computing device of claim 14, wherein the visual event template module is further configured to:
analyze a behavior of the user in scheduling events; and
create a new event template based on the analysis.

16. The computing device of claim 15, wherein the visual event template module is configured to create the new event template based on a determination of repetitive events and one or more aspects of the repetitive events.

17. The computing device of claim 11, wherein the visual event template module is further configured to:
employ at least one selected from a group consisting of a shading scheme, a highlighting scheme, a color scheme, and a textual scheme to enable display of additional information associated with the modified event.

18. The computing device of claim 11, wherein the one or more visual aids represent one or more event templates for selection and include at least one selected from a group consisting of an icon and an emoji.

19. The computing device of claim 11, wherein the fillable fields include at least one selected from a group consisting of a title field, a timing field, a location field, a free/busy state field, an attendee field, a reminder time field, a description field, and a private/public state field.

20. The computing device of claim 11, wherein the one or more processors are configured to infer the one or more aspects of the event from at least one selected from a group consisting of a usage history of the calendar application by the user, the usage history of the calendar application by one or more other users, a local event template source, and an external event template source.

* * * * *